(12) United States Patent
Moench et al.

(10) Patent No.: US 11,093,031 B2
(45) Date of Patent: Aug. 17, 2021

(54) DISPLAY APPARATUS FOR COMPUTER-MEDIATED REALITY

(71) Applicant: TRUMPF Photonic Components GmbH, Ulm (DE)

(72) Inventors: Holger Joachim Moench, Ulm (DE); Joachim Wilhelm Hellmig, Ulm (DE)

(73) Assignee: TRUMPF PHOTONIC COMPONENTS GMBH, Ulm (DE)

( * ) Notice: Subject to any disclaimer, the term of this patent is extended or adjusted under 35 U.S.C. 154(b) by 0 days.

(21) Appl. No.: 16/728,034

(22) Filed: Dec. 27, 2019

(65) Prior Publication Data

US 2020/0160566 A1 May 21, 2020

Related U.S. Application Data

(63) Continuation of application No. PCT/EP2018/067152, filed on Jun. 26, 2018.

(30) Foreign Application Priority Data

Jun. 28, 2017 (EP) .................................... 17178445

(51) Int. Cl.
*G06T 3/20* (2006.01)
*G06T 11/00* (2006.01)
(Continued)

(52) U.S. Cl.
CPC .......... *G06F 3/012* (2013.01); *G02B 27/017* (2013.01); *G06T 3/20* (2013.01); *G06T 11/00* (2013.01); *G02B 2027/0178* (2013.01)

(58) Field of Classification Search
CPC ....... G06F 3/012; G06F 3/013; G02B 27/017; G02B 2027/0178; G06T 3/20; G06T 11/00
See application file for complete search history.

(56) References Cited

U.S. PATENT DOCUMENTS 6,233,045 B1 * 5/2001 Suni .................. G01C 3/08
356/28.5
8,576,276 B2 * 11/2013 Bar-Zeev .............. G06T 19/006
348/53
(Continued)

FOREIGN PATENT DOCUMENTS

CN 106680827 A 5/2017
EP 1980999 A1 * 10/2008 ........... G06T 19/006
(Continued)

OTHER PUBLICATIONS

Giuliani, et al. "Laser Diode Self-Mixing Technique for Sensing Applications," Journal of Optics A: Pure and Applied Optics 4: S283-S294 (Nov. 4, 2002).

*Primary Examiner* — Michael Le
(74) *Attorney, Agent, or Firm* — Leydig, Voit & Mayer, Ltd.

(57) ABSTRACT

A display apparatus configured to be coupled to a movable object includes at least a first laser sensor module and a display device configured to display a field-of-view. The first laser sensor module is configured to determine, by self mixing interference measurements, movements of the movable object with respect to a reference object mechanically coupled to the movable object. The first laser sensor module is configured to emit at least three measurement beams in three different spatial directions to the reference object when the display apparatus is coupled to the movable object and the first laser sensor module is configured to determine velocity vectors or distances collinear to the spatial directions. The display device is configured to integrate at least one virtual object in the field-of-view in accordance with the determined movements of the movable object.

9 Claims, 9 Drawing Sheets

(51) Int. Cl.
    *G06F 3/01*     (2006.01)
    *G02B 27/01*     (2006.01)

(56) References Cited

U.S. PATENT DOCUMENTS

| | | | |
|---|---|---|---|
| 9,506,944 B2 * | 11/2016 | Carpaij | G01S 17/58 |
| 2010/0290030 A1 | 11/2010 | Schmidt et al. | |
| 2012/0044477 A1 | 2/2012 | Han | |
| 2013/0208362 A1 * | 8/2013 | Bohn | G02B 27/017 |
| | | | 359/630 |
| 2014/0015381 A1 | 1/2014 | Kikushima | |
| 2014/0267420 A1 | 9/2014 | Miller et al. | |
| 2015/0204976 A1 * | 7/2015 | Bosch | G01S 17/08 |
| | | | 356/4.01 |
| 2015/0253428 A1 * | 9/2015 | Holz | G01S 17/36 |
| | | | 356/5.01 |
| 2016/0164258 A1 | 6/2016 | Carpaij et al. | |
| 2016/0187974 A1 * | 6/2016 | Mallinson | A63F 13/5255 |
| | | | 463/32 |

FOREIGN PATENT DOCUMENTS

| | | | | |
|---|---|---|---|---|
| EP | 1980999 A1 | 10/2008 | | |
| JP | 2000314774 A | 11/2000 | | |
| JP | 2011511262 A | 4/2011 | | |
| JP | 2012525578 A | 10/2012 | | |
| JP | 2016520891 A | 7/2016 | | |
| JP | 2016525802 A | 8/2016 | | |
| WO | WO-0237410 A1 * | 5/2002 | | G01B 9/02092 |
| WO | WO 0237410 A1 | 5/2002 | | |
| WO | WO 2012059863 A1 | 5/2012 | | |

* cited by examiner

DISPLAY APPARATUS FOR COMPUTER-MEDIATED REALITY

CROSS REFERENCE TO RELATED APPLICATIONS

This application is a continuation of International Patent Application No. PCT/EP2018/067152, filed on Jun. 26, 2018, which claims priority to European Patent Application No. EP 17 178 445.7, filed on Jun. 28, 2017. The entire disclosure of both applications is hereby incorporated by reference herein.

FIELD

The invention relates to a display apparatus for displaying images comprising at least one virtual object. The invention further relates to a method of providing images comprising at least one virtual object. The invention finally relates to a corresponding computer program product.

BACKGROUND

U.S. Pat. No. 8,576,276 B2 discloses a see-through head-mounted display (HIVID) device, e.g., in the form of augmented reality glasses, which allows a user to view an augmented reality image. An inertial measurement unit tracks an orientation and location of a head of the user.

EP 1 980 999 A1 discloses an augmented reality image system for composing an augmented reality image by superposing a virtual image over a reality image. The virtual image is constructed in dependence of a position and orientation of a user's head relative to a reality image field of view. The system comprises at least two separate localization systems for determining the relative position and orientation of the user's head.

SUMMARY

The present disclosure provides improved display apparatuses.

According to a first aspect, a display apparatus is provided. The display apparatus is arranged to be coupled to a movable object. The display apparatus comprises: at least a first laser sensor module, wherein the first laser sensor module is arranged to determine movements of the movable object with respect to a reference object by means of self mixing interference measurements, and a display device for displaying a field-of-view, wherein the display device is arranged to integrate at least one virtual object in the field-of-view in accordance with the determined movements of the movable object.

Computer-mediated or augmented reality refers to the ability to add to, subtract information from, or otherwise manipulate perception of reality through the use of a display apparatus which is arranged to be coupled to a movable object. Examples of such display apparatuses may be hand-held device such as a smartphone or augmented reality (AR) goggles. AR goggles, for example, superimpose virtual objects to the real world. The real world information is acquired using camera devices like 2D or 3D camera devices and the virtual object are projected at the intended locations into the scenery. However such systems and the processing of the acquired images are rather slow compared to typical movements of the head. Such movements make the virtual objects "jump around" in the real scene and reduce user satisfaction significantly. Head movements are quite normal, almost unavoidable and cover a huge range from very slow to rather fast. Additional technologies discussed may include acceleration sensors as described in U.S. Pat. No. 8,576,276 B2 or triangulation. Accuracy of the known methods is an issue. The head position along 6 axes has to be tracked theoretically but not all axes are equally relevant as the projection on the retina and its resolution determines the accuracy.

A, for example, 3 axes measurement of movements of an object along the measurement axes by means of corresponding self mixing interference sensors gives non-ambiguous information on 6 axes movement. The movement of the object relative to the reference object may preferably be determined by means of measurement of the relative velocities along the measurement axes because accuracy of measurement of velocities is typically higher than for distance measurement alone. Alternatively or in addition the relative distance to the reference object may be determined by means of the self mixing interference sensors. The direction of movement can be determined by providing an appropriate drive current to the lasers and/or corresponding signal analysis (e.g. based on Fast Fourier Transformation) of the measurement signal provided by the self mixing interference sensors. The principles of such velocity and/or distance measurements by means of self mixing interference sensors are well known to those skilled in the art (see below).

A laser sensor module which is arranged to determine movements of the movable object relative to a reference object by means of self mixing interference measurements may therefore enable a precise adaption of the position of the virtual object or virtual objects within a field-of-view in accordance with the determined movement. The display apparatus comprising the display device may be coupled to any movable object. Examples of such movable objects may be the head of the user in case of, for example, AR goggles or the hand of the user in case of a handheld device like a smartphone. The display apparatus may further be adapted to communicate with an external processing device by means of the wireless communication link (e.g. optical or RF communication). The display apparatus may comprise a corresponding wireless communication module. The external processing device may be arranged to analyze the measurement results determined by means of the laser sensor module and calculate, for example, the adapted position of the virtual object or objects in the field-of-view based on the analysis of the measurement results. Digital information comprising the adapted position of the virtual object or objects may be transmitted to the display apparatus and displayed by means of the display device. The field-of-view may be the field-of-view of a user or a camera. The display apparatus may in the first case be, for example, semitransparent such that the user can look through the display apparatus. The display apparatus may comprise memory and processing devices in order to display the virtual object in the field-of-view of the user in accordance with the transmitted information. The display device may in the second case be a conventional display like, for example, LCD or OLED displays which are arranged to display the field-of-view of the camera and the virtual object in accordance with the movement of the movable object.

The display apparatus may alternatively or in addition be arranged to perform at least a part or even all of the signal processing. The display apparatus may in accordance with such an embodiment be autonomous with respect to the evaluation of the measurement signals and subsequent processing of display data.

The display apparatus may, for example, comprise a controller. The controller may be arranged to integrate the at least one virtual object in the field-of-view. The controller may be further arranged to adapt a position of the virtual object in the field-of-view based on the determined movements of the movable object.

The display apparatus may further comprise a camera device. The camera device is arranged to define the field-of-view of the movable object by recording images. The display device is arranged to display at least a part of the recorded images and the at least one virtual object in accordance with the determined movements of the movable object. The camera device is arranged to record images of the scene. Each image corresponds to a field-of-view of the camera at a defined moment in time. The position of the virtual object in the field of view of the camera and thus the respective image is adapted depending on the detected movement of the movable object relative to the reference object at the respective moment in time if the display apparatus is coupled to the movable object.

The controller may be further arranged to integrate the at least one virtual object in the displayed images. The controller may be further arranged to adapt a position of the virtual object in the displayed images based on the determined movements of the movable object. The controller may enable an autonomous display apparatus which is arranged to perform all measurements, the processing and the like in order to adapt the position of the virtual object in the field-of-view of the camera defined by the respective image recorded by the camera device as described above.

The first laser sensor module may be arranged to emit at least three measurement beams in three different spatial directions. The first laser sensor module is arranged to determine velocity vectors collinear to the spatial directions. The first laser sensor module is arranged to determine measurement data representative for at least three independent velocity vectors collinear to the spatial directions based on self mixing interference measurements. Subsequent data processing may be performed by means of an internal controller and/or an external data processing device as discussed above. The first laser sensor module may be arranged to emit four, five, six or more measurement beams in different spatial directions. Furthermore, the first laser sensor module may be arranged to emit two or more measurement beams in the same direction. The first laser sensor module may comprise one laser (e.g. semiconductor laser diode) in order to emit the at least three measurement beams by moving the laser or measurement beam by means of a corresponding scanning device or an array of lasers. The self mixing interference signal may be detected by means of a corresponding detector (e.g. photo diode integrated in the layer structure of the laser). Alternative embodiments of self mixing laser sensors which may be comprised by the laser sensor module or modules (see below) are well known to those skilled in the art. The first laser sensor module may be further arranged to determine at least three distances to the reference object along the respective spatial directions. Subsequent measurements of at least three velocity vectors and/or distances may be used to determine a rotation of the moveable object The first laser sensor module may be arranged to emit at least three measurement beams in a different solid angle of a virtual sphere around the display apparatus in comparison to the field-of-view. Self mixing interference measurements are precise and reliable. The data processing for determining the movement based on self mixing interference measurements does not need extensive data processing capabilities.

Detection range of self mixing interference measurements may be limited to several meters. It may therefore be advantageous if the measurement beams are directed, for example, to the back, to the left, to the right, to the floor or to the ceiling in order to determine a nearby reference object or objects independent from the field-of-view. Relative movements with respect to these reference objects outside the field-of-view may enable a precise and fast determination of the position of the virtual object within the field-of-view.

The first laser sensor module may be arranged to emit the at least three measurement beams to the reference object when the display apparatus is coupled to the movable object. The reference object is in this embodiment mechanically coupled to the movable object. The reference object which is mechanically coupled (e.g. by a hinge or a bearing) may be a static or a movable reference object. The reference object is selected such that potential movements of the reference object are much slower than the movements of the movable object in order to determine the position of the virtual object within the field-of-view with sufficient accuracy. Using a reference object which is coupled to the movable object may enable reliable movement detection because the laser sensor module can be arranged such that a distance between the movable object and the mechanically coupled reference object is below a detection threshold of the self mixing interference sensor comprised by the laser sensor module.

The first laser sensor module may comprise an array of laser sensors. The array of laser sensors is arranged to emit a multitude of measurement beams in different directions. The controller is arranged to determine the movements of the movable object based on self mixing interference measurements provided by means of at least three laser sensors when the display apparatus is coupled to the movable object.

The controller may especially be arranged to check whether a laser sensor provides a reliable self mixing interference signal. The controller may further be arranged to discard measurement results which are not reliable (no reference object in range, relatively fast moving obstacles like hair in the respective measurement beam etc.).

The display apparatus may comprise at least a second laser sensor module. The second laser sensor module is arranged to determine movements of the movable object by means of self mixing interference measurements when the display apparatus is coupled to the movable object. The second laser sensor module is arranged to emit at least three measurement beams in a different solid angle of the virtual sphere around the display apparatus in comparison to the first laser sensor module. Alternatively or in addition to the array of laser sensors two, three or more laser sensor modules may be used in order to determine the movement of the movable object relative to the reference object. The laser sensor modules may, for example, be arranged such that the solid angles which are covered by the respective laser sensor modules overlap. The overlap may be adapted to the respective movable object and reference object such that it is likely that at least one of the laser sensor modules can determine the relative movement by means of a reference object within the detection range of the respective laser sensor module. Alternatively or in addition, the laser sensor module or modules may be provided covering non-overlapping solid angles (e.g. one directed to the floor and one directed to the ceiling) in order to detect the relative movements by means of a reference object in detection range.

One or more of the laser sensor modules may preferably be arranged to emit the at least three measurement beams to the reference object if the movable object is mechanically coupled to the reference object when the display apparatus is coupled to the movable object. Directing the measurement beams of one or more laser sensor modules to a mechanically coupled reference object may enable reliable detection of the relative movement for broad range of movements as described above.

The controller may preferably be arranged to switch on or off one or more of the laser sensor modules (depending on the number of laser sensor modules) depending on the self mixing interference signal received by the respective laser sensor module. Switching on or off a laser sensor module may enable to use only the laser sensor module which receives reliable self mixing interference signals. A laser sensor module which does not receive a reliable self mixing interference signal may be switched off for a defined time period and switched on again in order to determine whether reliable self mixing interference signals can be measured. Switching off the laser sensor modules may reduce energy consumption of the display apparatus. Reduction of energy consumption may increase operation time of the display apparatus if the display apparatus depends on local power source (e.g. rechargeable battery).

The second laser sensor module may be arranged to emit at least three measurement beams to the reference object when the display apparatus is coupled to the movable object. The reference object is in this case again mechanically coupled to the movable object. The controller is arranged to switch on or off the first laser sensor module or the second laser sensor module depending on the movements determined by means of the self mixing interference signals determined by means of the first laser sensor module or the second laser sensor module.

A number of two three, four or more laser sensor modules may, for example, in a resting position be directed to certain parts of a mechanically coupled reference object. One or more of the laser sensor modules may be activated or deactivated depending on an estimated (or more precise calculated) relative position to the reference object if it is likely that the other sensor module does provide or not provide reliable self mixing interference signals because of the shape of the reference object or any other known potential obstacle. Knowledge about the shape of the reference objects or other obstacles and possible relative movements may be necessary in order to determine reliable switching points. The corresponding information may be stored in a memory device of the controller or a memory device of an external processing device. Adaptive switching of the laser sensor modules may reduce energy consumption of the display apparatus.

The movable object may be a head of a user. The display device is in this embodiment arranged to be placed in close proximity to at least one eye of the user. The display apparatus may in this case be, for example, AR goggles and the like (head mountable display apparatus).

The display apparatus may comprise a frame with at least one extension. The extension is arranged to provide an improved reading range for the at least first laser sensor module. The extension may be an antenna like construction especially improving viewing angle with respect to a body of the user (reference object) when the display apparatus is mounted on the head of the user.

According to a second aspect a method of providing images comprising at least one virtual object is provided. The method comprises the steps of: determining movements of a movable object with respect to a reference object by means of self mixing interference measurements, and integrating the at least one virtual object in a field-of-view in accordance with the determined movements.

The method may comprise further steps in accordance with the embodiments discussed above.

According to a further aspect, a computer program product is presented. The computer program product comprises code means which can be saved on at least one memory device comprised by the display apparatus or at least one memory device comprised by an external computation device coupled with the display apparatus according to any embodiment described above. The code means are arranged such that the method described above can be executed by means of at least one processing device comprised by the display apparatus or at least one processing device comprised by an external computation device coupled with the display apparatus.

The memory device or devices may be any physical device being arranged to store information especially digital information. The memory device may be especially selected out of the group solid-state memory or optical memory.

The processing device or devices may be any physical device being arranged to perform data processing especially processing of digital data. The processing device may be especially selected out of the group processor, microprocessor or application-specific integrated circuit (ASIC).

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Various embodiments of the invention will now be described by way of the Figures. In the Figures, like numbers refer to like objects throughout. Objects in the Figures are not necessarily drawn to scale.

Self-mixing interference is used for detecting movement of and distance to an object. Background information about self-mixing interference is described in "Laser diode self-mixing technique for sensing applications", Giuliani, G.; Norgia, M.; Donati, S. & Bosch, T. , Laser diode self-mixing technique for sensing applications, Journal of Optics A: Pure and Applied Optics, 2002, 4, S. 283-S. 294 which is incorporated by reference. Detection of movement of a fingertip relative to a sensor in an optical input device is described in detail in International Patent Application No. WO 02/37410 which is incorporated by reference. The principle of self-mixing interference is discussed based on the examples presented in International Patent Application No. WO 02/37410. A diode laser having a laser cavity is provided for emitting a laser, or measuring, beam. At its upper side, the device is provided with a transparent window across which an object, for example a human finger, is moved. A lens is arranged between the diode laser and the window. This lens focuses the laser beam at or near the upper side of the transparent window. If an object is present at this position, it scatters the measuring beam. A part of the radiation of the measuring beam is scattered in the direction of the illumination beam and this part is converged by the lens on the emitting surface of the laser diode and re-enters the cavity of this laser. The radiation re-entering the cavity of the diode laser induces a variation in the gain of the laser and thus in the intensity of radiation emitted by the laser, and it is this phenomenon which is termed the self-mixing effect in a diode laser.

The change in intensity of the radiation emitted by the laser or of the optical wave in the laser cavity can be detected by a photo diode or a detector arranged to determine an impedance variation across the laser cavity. The diode or impedance detector converts the radiation variation into an electric signal, and electronic circuitry is provided for processing this electric signal.

The self-mixing interference signal may, for example, be characterized by a short signal burst or a number of signal bursts. The Doppler frequency as observed in these signals is a measure for the relative velocity along the optical axis. It may therefore be preferred to use a DC drive current in order to simplify signal detection and signal analysis. A modulated drive current may be used in order to determine the position or velocity of the object, for example, by means of self-mixing interference signals which may be generated by reflection of laser light. The distance (and optionally velocity) may be determined within one measurement or in a subsequent measurement step. It may therefore be possible or even beneficial to use a DC drive current in a first period in time in order to generate a measurement signal related to velocity and a modulated drive current in a second time period in order to determine distance. Special signal analysis and/or modulated drive currents like a saw tooth drive current as described, for example, in FIG. 7 and the corresponding description in International Patent Application No. WO 02/37410 may be used to determine the direction of the relative movement.

Figure 1:
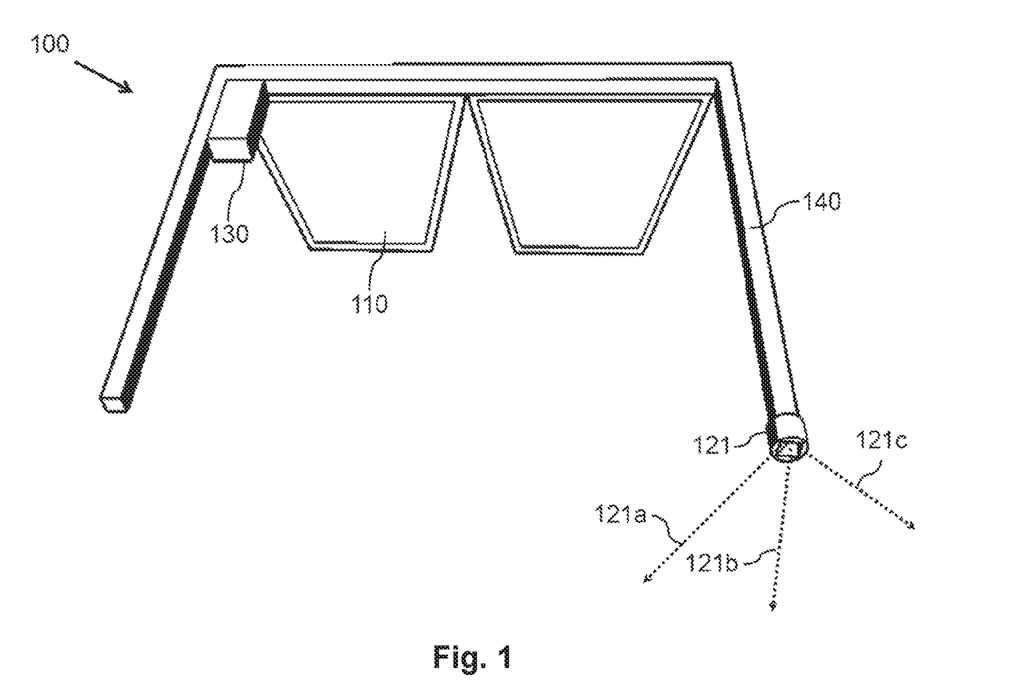
FIG. 1 shows a schematic of a first display apparatus.

FIG. 1 shows a schematic of a first display apparatus 100. The first display apparatus 100 is an AR goggle which comprises a frame 140, a controller 130 mechanically coupled with the AR goggle and a first laser sensor module 121 which is arranged at the end of the right arm of the goggle and a display device 110. The display device 110 comprises two parts wherein each part is fixed within the frame and arranged such that each is in front of one eye of the user like in usual glasses. The display device 110 is semitransparent such that the user wearing the AR goggle can see a scene through the display device 110 like in conventional glasses. The controller 130 is arranged to integrate at least one virtual object in the scene the user of the AR goggle looks at. The virtual object may, for example, be a pointer or marker (e.g. comprising information) to an object in the scene observed by the user. The pointer or marker may, for example, be provided via a communication interface of the AR goggle (not shown). The AR goggle may, for example, be coupled to a handheld device (e.g. smartphone) by means of the wireless communication link (e.g. Bluetooth link). The handheld device may provide information with respect to objects nearby to the user and/or the user can provide instruction like, for example, "mark object in the center of my field of view". The controller 130 is electrically connected with the first laser sensor module in order to receive self mixing interference measurement data based on three measurement beams 121a, 121b, 121c pointing in different spatial directions and in nearly the opposite direction of the field-of-view of the display device 110. The measurement beams 121a, 121b, 121c are emitted by three different lasers (e.g. VCSEL), wherein each of the lasers comprises an integrated photo diode in order to receive reflected laser light reflected by a reference object (not shown) within the detection range of the first laser sensor module. The reference object may be any object like, for example, a wall behind the user. The self mixing interference measurements enabled by means of the three different measurement beams 121a, 121b, 121c enable determination of a movement of the head of the user (movable object not shown) relative to the reference object by means of the controller 130. The position of the virtual object (e.g. mark or label) provided by the user is adapted in accordance with the movement of the head of the user. The first laser sensor module 121 is in this embodiment arranged to determine three independent velocity vectors by means of self mixing interference. The first laser sensor module 121 further comprises an electrical driver (not shown) in order to provide drive currents to the laser sensors. The first display apparatus 100 further comprises a rechargeable battery (not shown) in order to provide electrical power to the components especially the controller 130.

Figure 2:
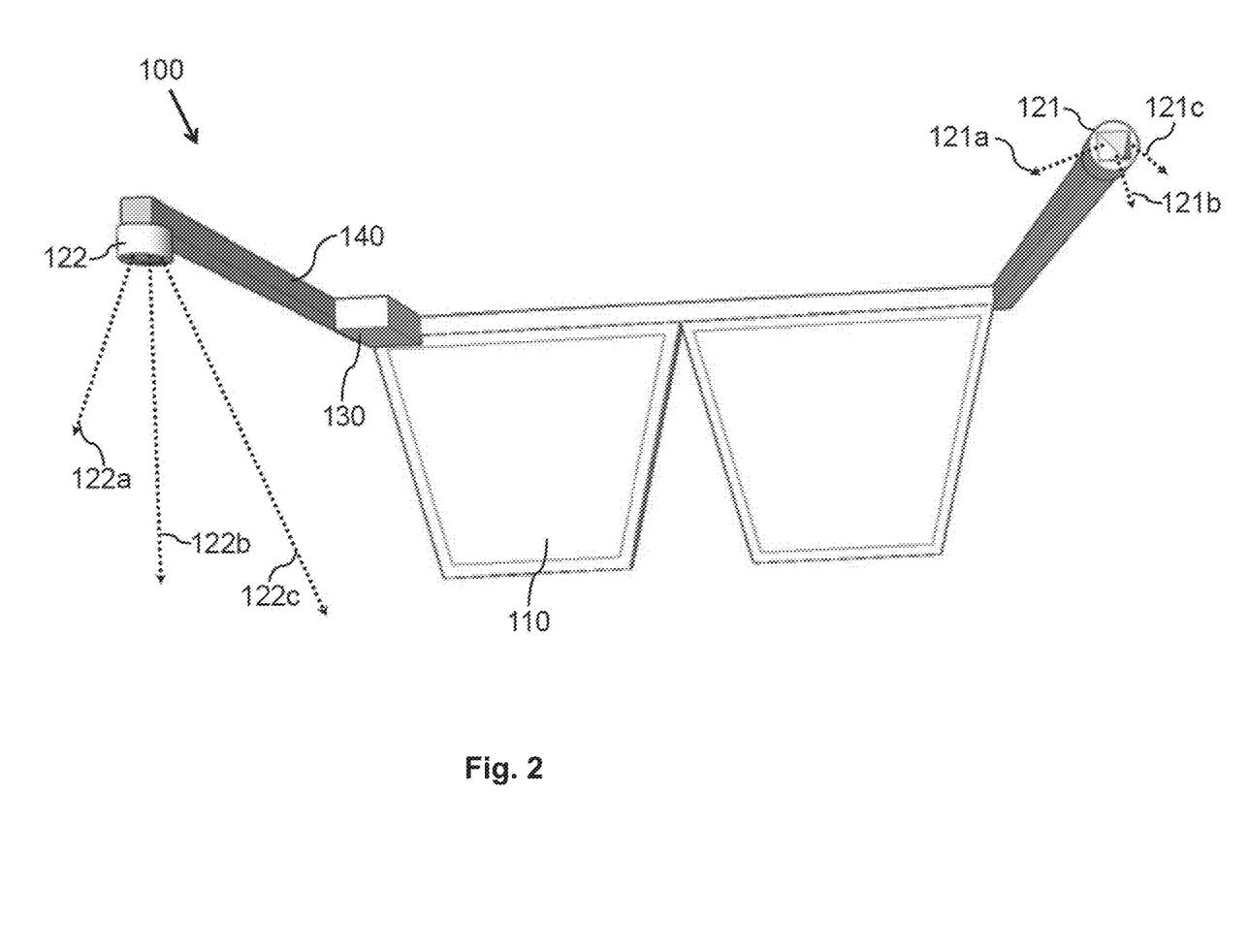
FIG. 2 shows a schematic of a second display apparatus.

FIG. 2 shows a schematic of a second display apparatus 100. The configuration of the second display apparatus 100 is very similar to the configuration of the first display apparatus 100 discussed with respect to FIG. 1. The second display apparatus 100 comprises in addition to the first laser sensor module 121 at the end of the right arm of the frame 140 a second laser sensor module 122 at the end of the left arm of the frame 140. The second laser sensor module 122 comprises three laser sensors emitting three measurement beams 122a, 122b, 122c pointing down in three different spatial directions such that the measurement beams usually hit the body of the user wearing the AR goggle. The in relation to the head usually slowly moving body of the user is used as a potential further reference object in order to determine movements of the head of the user. The first and the second laser sensor module 121, 122 are in this case arranged to determine velocities and distances to the respective reference object in alternating time periods. The second display apparatus 100 further comprises a wireless communication module (not shown) enabling a wireless communication link similar as described with respect to FIG. 1. The wireless communication link is used in order to transfer measurement data provided by the first and the second laser sensor module 121, 122 to an external computation device. The external computation device in communication with the AR goggle supports evaluation of the measurement data and provides information based on the evaluation to the AR goggle in order to adapt the position of the virtual object in accordance with the movement of the head of the user relative to the body of the user or any other reference object within the detection range of the laser sensor module 121, 122.

Figure 3:
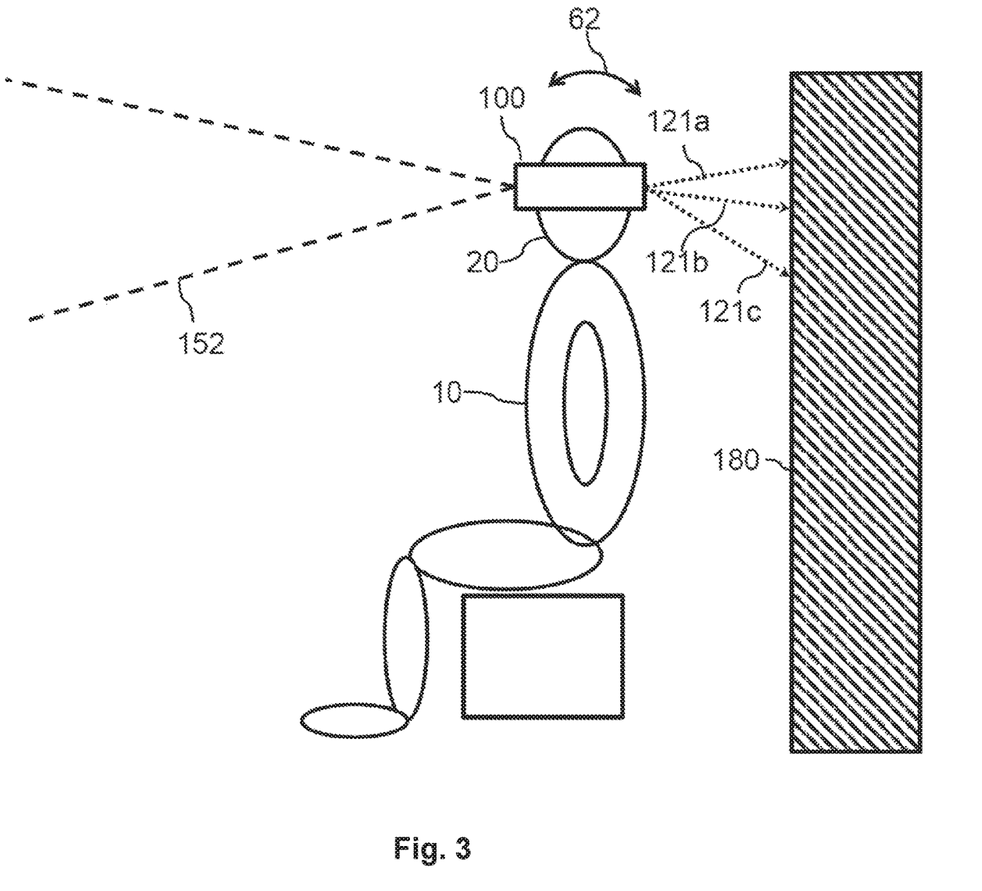
FIG. 3 shows a schematic of a third display apparatus.

FIG. 3 shows a schematic of side view of a third display apparatus 100. The third display apparatus 100 is again and AR goggle. The AR goggle comprises a camera device (not shown). The camera device determines the field-of-view 152 of the third display apparatus which is in the viewing direction of a user wearing the AR goggle. The display device 110 (e.g. LCD) is arranged to show the images recorded in the field-of-view of the camera device. A first laser sensor module emits three measurement beams 121*a*, 121*b*, 121*c* in a half space opposite to the field-of-view of the camera device. The three measurement beams hit a wall 180 (reference object) behind the user and a part of the laser light is back reflected to the respective laser sensors comprised by the first laser sensor module and corresponding self mixing interference signals are determined in order to determine a pitch 62 of the head (movable object 20) of the user. The third display apparatus 100 is arranged to position a virtual object in the images recorded by the camera device in accordance with the detected pitch 62 and display the virtual object and the recorded image to the user. The virtual object may, for example, be automatically added by means of the third display apparatus 100 by means of image recognition applied to the recorded images. The image recognition may, for example, be performed in this embodiment by means of the controller (not shown) comprised by the third display apparatus 100. Alternatively or in addition a wireless communication link may enable more advanced image recognition processing and access to databases (Internet optionally coupled with position detection) in order to integrate virtual objects in the images recorded by the camera device.

Figure 4:
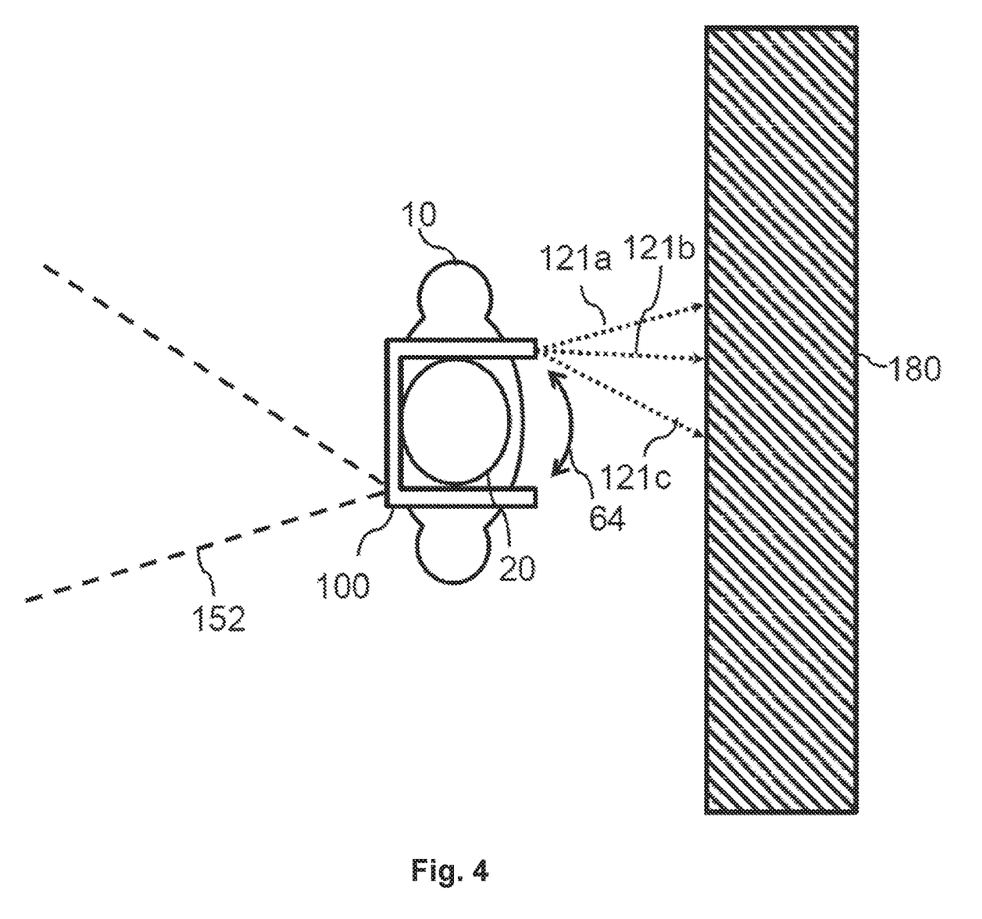
FIG. 4 shows a different perspective of the third display apparatus.

FIG. 4 shows a schematic top view of the third display apparatus 100. The first laser sensor module is integrated at the end of the right arm of the AR goggle similar as shown and discussed with respect to FIG. 1. The camera device (not shown) is integrated in the left front corner of the frame of the AR goggle. FIG. 4 shows detection of a yaw of the head of the user by means of the three measurement beams 121*a*, 121*b*, 121*c* and laser light back reflected from wall 180.

Figure 5:
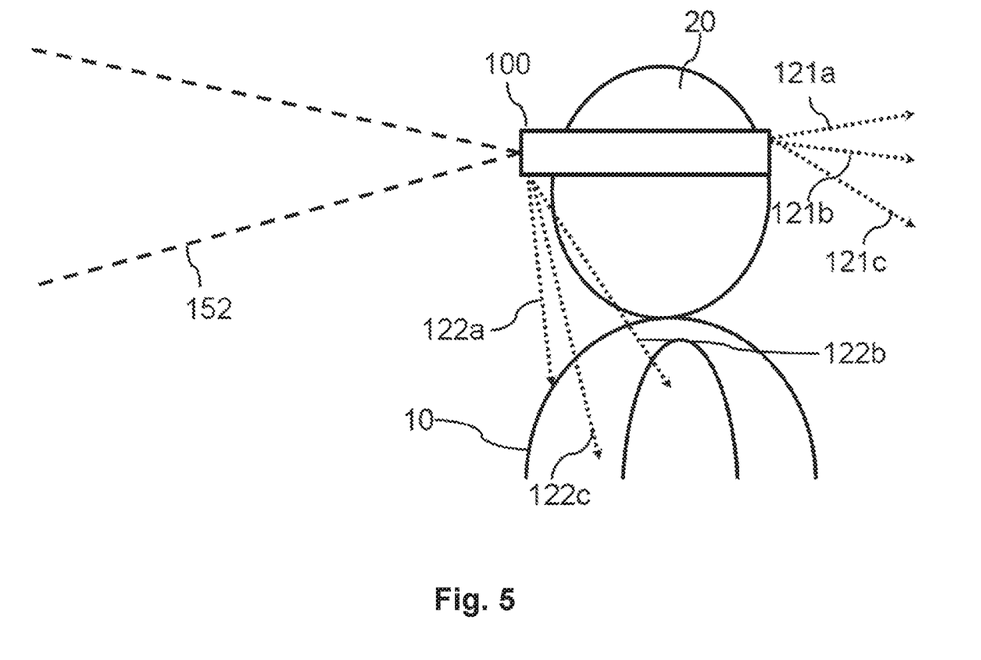
FIG. 5 shows a schematic of a fourth display apparatus.

FIG. 5 shows a schematic picture of a fourth display apparatus 100. The fourth display apparatus 100 is another example of an AR goggle comprising a camera device (not shown) defining the field-of-view 152 of the fourth display apparatus 100. The AR goggle comprises an additional second laser sensor module arranged in the right front corner of the AR goggle. Three measurement beams of the second laser sensor module 122*a*, 122*b*, 122*c* are emitted in the direction of a further reference object 10 which is in this case the body of the user. The head of the user which is again the movable object 20 is mechanically coupled by means of the neck with the body of the user. The three measurement beams of the second laser sensor module 122*a*, 122*b*, 122*c* are arranged such that the body is hit for a broad range of movements of the head of the user. The body is therefore most of the time within the detection range of the second laser sensor module. The position of a virtual object within the recorded image can in this case be adapted by means of the self mixing interference signals provided by means of the first or second laser sensor module. The display apparatus 100 may comprise in another embodiment two side extensions each comprising a laser sensor module emitting measurement beams to a part of the shoulder, back or breast underneath the respective laser sensor module. Such a configuration optionally with further laser sensor modules, optionally emitting three, four, five or more measurement beams may be used in order to enable monitoring of the movement based on back reflection of laser light by means of the body of the user for essentially all possible movements of the head (movable objects 20).

Figure 6:
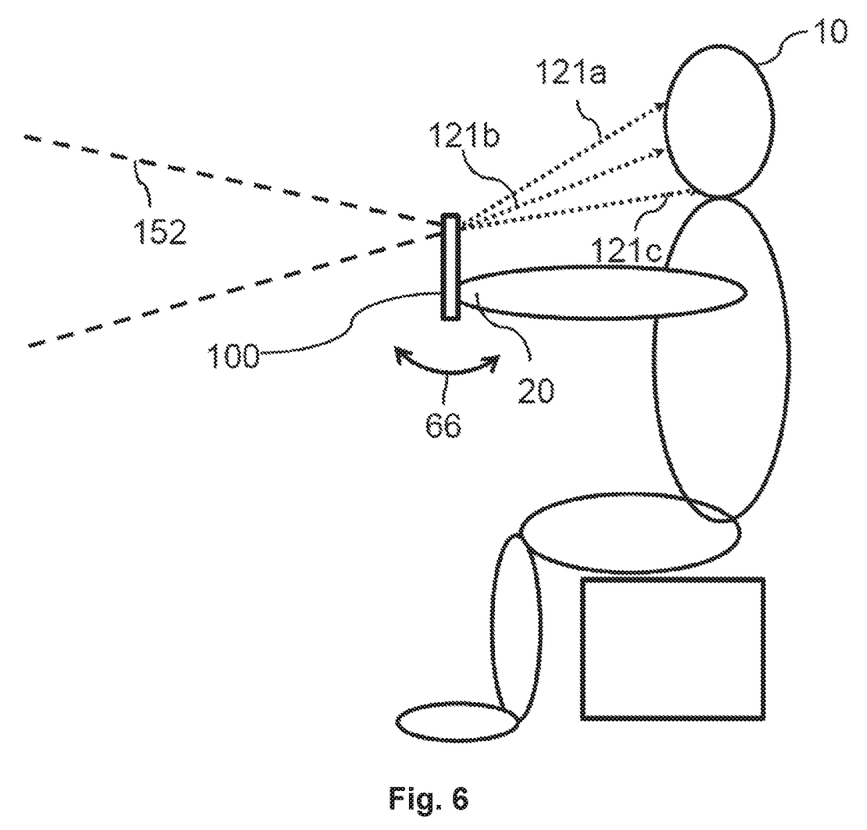
FIG. 6 shows a schematic of a fifth display apparatus.

FIG. 6 shows a schematic of a fifth display apparatus 100. The fifth display apparatus 100 is in this case a handheld device (e.g. smartphone) comprising a display device (not shown) which can be directed to a user. The handheld device further comprises a camera device (not shown) defining a field-of-view 152 in an opposite direction in comparison to the display device (e.g. camera device integrated in the backside of a smartphone). The fifth display apparatus 100 further comprises a first laser sensor module (not shown) emitting three measurement beams 121*a*, 121*b*, 121*c* in the direction of a user looking at the display device. The reference object 10 to which the three measurement beams 121*a*, 121*b*, 121*c* are emitted is in this case to the head of the user. The head of the user is usually within certain limits in a defined spatial relationship with respect to the display device. The handheld device is coupled to the hand of the user which is in this case the movable object 20. All or a part of the three measurement beams 121*a*, 121*b*, 121*c* may in an alternative embodiment be directed, for example, to the chest of the user. Optionally more than three measurement beams 121*a*, 121*b*, 121*c* are used in order to determine the relative movement of the movable object 20 relative to the reference object 10. The processing capability of the handheld device is used to project or integrate a virtual object in the recorded scene or image displayed by the display device. The virtual object may, for example, be an arrow pointing in a direction the user intends to move (navigation). The user may raise the handheld device in order to get additional information by means of the arrow (e.g. when he/she has to move to the right or left). A straight arrow may depending on the determined movements change to an arrow, for example, turning to the right. The virtual object may alternatively be information with respect to a building in the field-of-view 152 of the camera device presented in the recorded and displayed image. The handheld device is adapted by means of the self mixing interference measurements that the information sticks to the respective building essentially independent from the relative movement of the handheld device with respect to the body and/or head of the user. The handheld device may alternatively or in addition comprise a laser sensor module pointing in a different direction (e.g. ground). The handheld device may alternatively or in addition comprise more laser sensor modules arranged, for example, in the sides of the handheld device and the laser sensor module is used to detect the relative motion with respect to a further or alternative reference object 10 (e.g. ground) depending on the self mixing interference signal received by the respective laser sensor module and/or information extracted from the image recorded by the camera device. The handheld device may, for example, in this case be adapted to switch off laser sensor modules which do not receive a reliable self mixing interference signal and/or are directed in a direction in which it is unlikely to hit a reference object 10 (e.g. sky).

Figure 7:
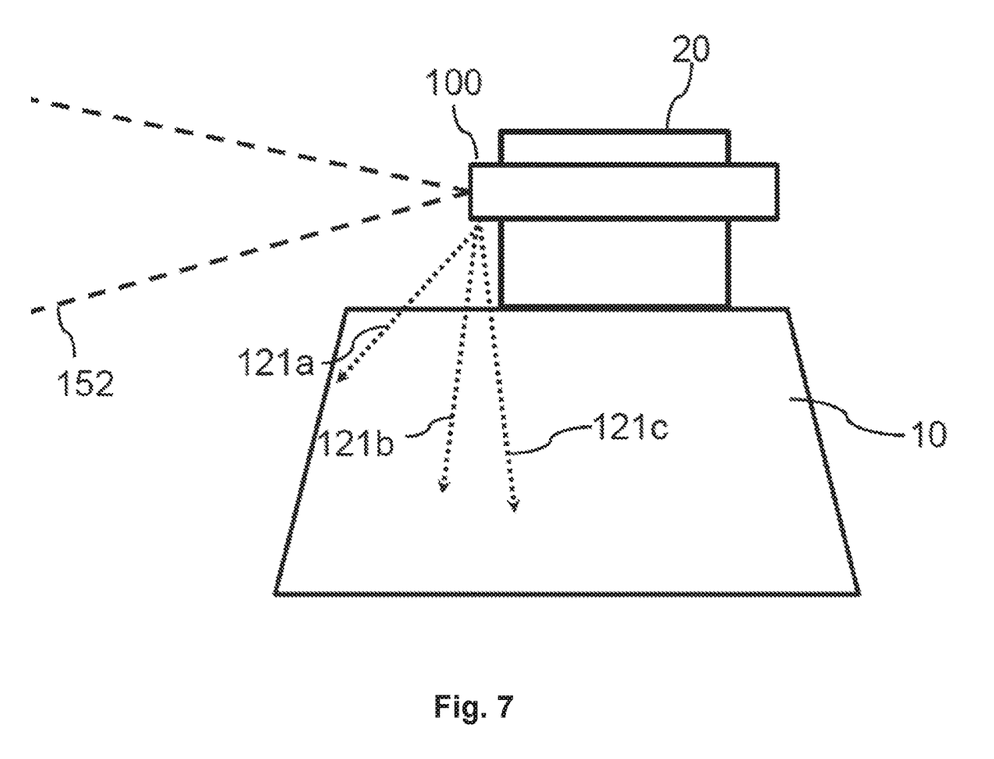
FIG. 7 shows a schematic of a sixth display apparatus.

FIG. 7 shows a schematic of a sixth display apparatus 100. The sixth display apparatus 100 comprises a camera device defining a field-of-view 152 for recording images. The sixth display apparatus 100 is coupled to a movable object 20. The movable object 20 is coupled by means of a bearing to a reference object 10. The movable object 20 is arranged to move around a rotation axis defined by the bearing. A first laser sensor module (not shown) is arranged to emit three measurement beams 121*a*, 121*b*, 121*c* to the reference object 10. A virtual object is integrated in the recorded images in accordance with the detected relative movement of the movable object 20 with respect to the reference object 10.

Figure 8:
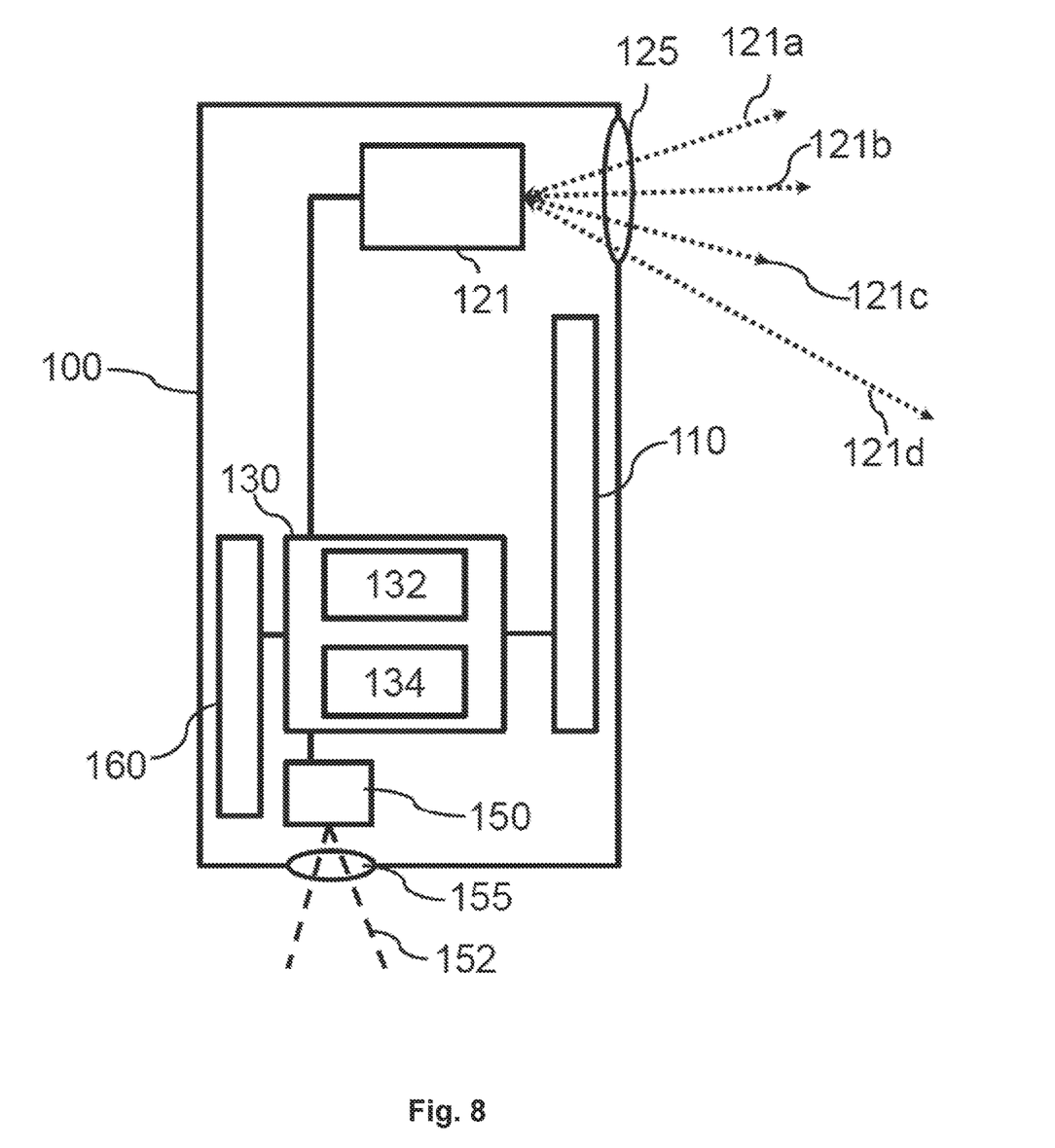
FIG. 8 shows a schematic of an seventh display apparatus.

FIG. 8 shows a schematic of a seventh display apparatus 100. The seventh display apparatus 100 comprises a first laser sensor module 121 arranged to emit four measurement beams 121a, 121b, 121c, 121d and a sensor optics 125 which may comprise one or more optical devices to direct and/or focus the measurement beams 121a, 121b, 121c, 121d. The first laser sensor module 121 comprises in this case four laser sensors and corresponding detectors in order to detect the self mixing interference signal of the respective laser sensor. The first laser sensor module 121 further comprises an electrical driver to provide an electrical drive current to the laser sensors. The seventh displays apparatus 100 further comprises a camera device 150 and camera optics 155 defining a field-of-view 152 of the camera device 150. The field-of-view 152 of the camera device is in a different direction in comparison to the spatial directions of the measurement beams 121a, 121b, 121c, 121d. The first laser sensor module 121 and the camera device 150 are electrically connected with a controller 130 comprising a controller memory device 132 and a controller processing device 134. The controller 130 is further connected to a wireless communication interface 160 and a display device 110 (OLED display). The controller 130 receives digital data from the camera device 150 representing recorded images in the field-of-view 152 of the camera. The digital data is analyzed by means of the controller processing device 134 by means of image processing. Objects in the recorded images are recognized by means of the image processing and virtual objects which are linked with the objects in the recorded images are identified by means of data stored either in the controller memory device 132 or by data received via the wireless communication interface 160. Alternatively a user may link a virtual object with an object in the recorded images by means of commands which can be received via the wireless communication interface 160 or by means of direct input interface (not shown) of the seventh display apparatus 100 (e.g. microphone connected to the controller 130 in order to receive voice commands). The controller 130 further receives measurement data resulting from self mixing interference measurements provided by means of the first laser sensor module 121. The controller 130 determines the relative movement of a movable object (not shown) to which the seventh display apparatus 100 is coupled with respect to a reference object (not shown) by means of the measurement data. The controller 130 transfers data representing processed recorded images to display device 110. The processed recorded images comprise at least part of the recorded images and one or more virtual objects linked to one or more objects in the recorded images wherein the position of the virtual objects within the recorded image is adapted to the relative movement determined by means of the self mixing interference measurements. The display device 110 displays the at least part of the recorded images together with the one or more virtual objects based on the data representing the processed recorded images. The seventh display apparatus 100 and each of the other embodiments discussed above may comprise a local power source (not shown) for providing electrical power to the components of the display apparatus 100.

Figure 9:
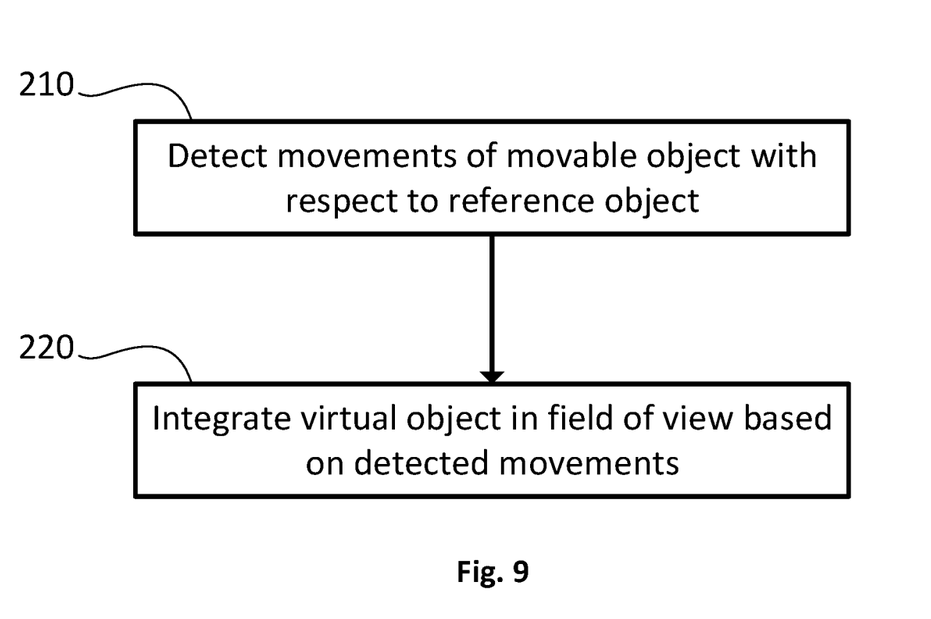
FIG. 9 shows a sketch of a method of providing images comprising at least one virtual object.

FIG. 9 shows a sketch of a method of providing images comprising at least one virtual object. Movements of a movable object 20 with respect to a reference object 10, 180 are detected in step 210 by means of self mixing interference measurements. In step 220 the at least one virtual object is integrated in the field-of-view 152 in accordance with the determined movements.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 10 reference object
20 movable object
62 pitch
65 yaw
66 movement
100 display apparatus
110 display device
121 first laser sensor module
121a first measurement beam of first laser sensor module
121b second measurement beam of first laser sensor module
121c third measurement beam of first laser sensor module
122 second laser sensor module
122a first measurement beam of second laser sensor module
122b second measurement beam of second laser sensor module
122c third measurement beam of second laser sensor module
125 sensor optics
130 controller
132 controller memory device
134 controller processing device
140 frame
150 camera device
152 field-of-view
155 camera optics
160 wireless communication interface
180 wall
210 step of recording images
220 step of determining movements
230 step of displaying recorded images
240 step of integrating virtual object
250 step of adapting position of virtual object

The invention claimed is:
1. A display apparatus configured to be coupled to a movable object, the display apparatus comprising:
a first laser sensor module; and
a display device configured to display a field-of-view, wherein the first laser sensor module is configured to determine, by self mixing interference measurements, movements of the movable object with respect to a reference object mechanically coupled to the movable object, wherein the first laser sensor module is configured to emit at least three measurement beams in three different spatial directions to the reference object when the display apparatus is coupled to the movable object, wherein the first laser sensor module is configured to determine velocity vectors or distances collinear to the spatial directions, and wherein the display device is configured to integrate at least one virtual object in the field-of-view in accordance with the determined movements of the movable object;

wherein the first laser sensor module is configured to emit the at least three measurement beams in a different solid angle of a virtual sphere around the display apparatus in comparison to the field-of-view;

wherein the display apparatus comprises a second laser sensor module, wherein the second laser sensor module is configured to determine movements of the movable object by self mixing interference measurements when the display apparatus is coupled to the movable object, wherein the second laser sensor module is configured to emit at least three measurement beams in a different solid angle of the virtual sphere around the display apparatus in comparison to the first laser sensor module;

wherein a controller is configured to switch on or off the first laser sensor module or the second laser sensor module depending on the self mixing interference signal received by the first laser sensor module or the second laser sensor module; and wherein the second laser sensor module is configured to emit at least three measurement beams to the reference object when the display apparatus is coupled to the movable object, wherein the controller is configured to switch on or off the first laser sensor module or the second laser sensor module depending on the movements determined by the self mixing interference signals determined by the first laser sensor module or the second laser sensor module.

2. The display apparatus according to claim 1, the display apparatus further comprising a camera device, wherein the camera device is configured to define the field-of-view of the movable object by recording images, and wherein the display device is configured to display at least a part of the recorded images and the at least one virtual object in accordance with the determined movements of the movable object.

3. The display apparatus according to claim 2, wherein the controller is further configured to integrate the at least one virtual object in the part of the recorded images, and wherein the controller is further configured to adapt a position of the at least one virtual object in the displayed images based on the determined movements of the movable object.

4. The display apparatus according to claim 2, wherein the display apparatus is a handheld device comprising the display device, wherein the handheld device further comprises the camera device, wherein the field-of-view defined by the camera device is in an opposite direction in comparison to the display device, wherein the first laser sensor module is configured to emit the at least three measurement beams in the direction of a user looking at the display device, wherein the moveable object is a hand of the user.

5. The display apparatus according to claim 1, wherein the first laser sensor module comprises an array of laser sensors, wherein the array of laser sensors is configured to emit a multitude of measurement beams in different directions, and wherein the controller is configured to determine the movements of the movable object based on self mixing interference measurements provided by at least three laser sensors of the array of laser sensors when the display apparatus is coupled to the movable object.

6. The display apparatus according to claim 1, wherein the movable object is a head of a user, and wherein the display device is configured to be placed in close proximity to at least one eye of the user.

7. The display apparatus according to claim 1, wherein the display device is configured to integrate the at least one virtual object in the field-of-view based on the determined movements of the moveable object with respect to the reference object.

8. The display apparatus according to claim 7, wherein the movable object is configured to rotate around an axis defined by a linkage, the linkage mechanically coupling the reference object to the movable object, the linkage comprising a hinge and/or a bearing.

9. The display apparatus according to claim 1, wherein the first laser sensor module is configured to deactivate based on a calculated position of the reference object with respect to the movable object.

* * * * *